March 11, 1958     C. C. MITCHELL     2,826,273
DASHPOT
Filed Feb. 26, 1953
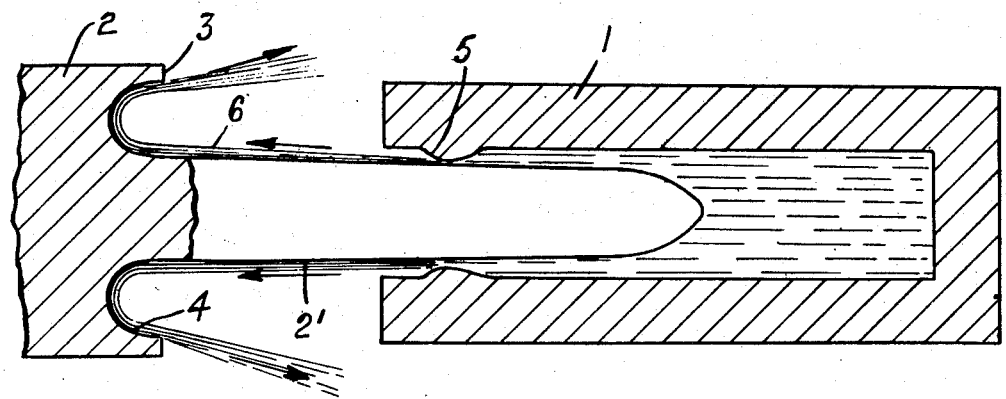
INVENTOR
COLIN C. MITCHELL
BY
*Pennie, Edmonds, Morton, Barrows & Taylor*
ATTORNEY

United States Patent Office 2,826,273
Patented Mar. 11, 1958

2,826,273

DASHPOT

Colin C. Mitchell, Edinburgh, Scotland

Application February 26, 1953, Serial No. 338,965

3 Claims. (Cl. 188—87)

This invention relates to dashpots of the type comprising a cylinder which is open at one end to receive the end of a moving plunger or ram whose movement is to be retarded and finally stopped, and particularly to such dashpots in which the cylinder is maintained full of a liquid, preferably water, and the velocity of the movement of the plunger, or a part thereof, into the cylinder is retarded and the plunger finally is brought to a stop by restricting the flow of liquid from the cylinder as the plunger enters it, thereby causing the liquid in the cylinder to act as a cushioning medium for the plunger. In such an arrangement the entire initial energy of the piston is wholly absorbed by the generation of pressure energy in the liquid. Such a dashpot, and the means whereby the cylinder may be maintained full of fluid at all times, is disclosed in application Serial No. 198,279, filed November 30, 1950.

In dashpots of the kind just referred to, it is desirable that the rate of velocity deceleration of the plunger during the retardation of its movement should remain constant and that the maximum retardation should be kept down as much as possible. This can be accomplished only if the pressure of the liquid in the cylinder during the cushioning of the movement of the plunger remains substantially constant.

In accordance with the present invention the above desirable results are obtained by progressively restricting the passage through which the liquid flows from the cylinder as the velocity of movement of the plunger into the cylinder decreases and by utilizing the pressure energy generated in the liquid to further retard the velocity of movement of the plunger into the cylinder.

More particularly, the present invention contemplates a dashpot arrangement in which the liquid is caused to be ejected from the open end of the cylinder as the plunger passes into it and the portion of the plunger which enters the open end of the cylinder is tapered convergently towards its leading end so that the radial distance between the plunger and the cylinder at its open end progressively is lessened as the plunger moves into the cylinder and the space for the out-flow of liquid from the cylinder progressively restricted, and in which the jet of liquid ejected from the cylinder through such space, as the plunger enters the cylinder, is directed against an outwardly-extending shoulder or face formed on the plunger. The face of the plunger against which the jet of liquid is directed preferably is in the form of an annular groove of such cross-section, for example, semi-circular, as will deflect the liquid backwardly in the general direction of the cylinder, thereby imparting the maximum velocity to the liquid in the reverse direction. When such face of the plunger is so formed the pressure energy of the liquid ejected from the cylinder in the annular jet is utilized to the maximum extent in retarding the movement of the plunger. The taper of the tapered portion of the plunger preferably is such that the surface of the tapered portion merges smoothly into the surface of the groove.

A practical embodiment of the invention is illustrated in the accompanying diagrammatic drawing in which 1 denotes a horizontally disposed cylinder. In operation, this cylinder is maintained full of liquid in any desired manner, such as by circumferential jets of the type referred to in the foresaid application. If desired, the cylinder may diverge in the direction towards its open end. 2 denotes a plunger movable into the cylinder 1 and positioned coaxially therewith. The plunger has an end portion 2' which is tapered convergently towards its leading end. The taper of the portion 2' is not critical and may be varied to give any desired pressure-stroke curve with respect to retardation and pressure. The plunger 2 adjacent the following end of the portion 2' is formed with a shoulder 3 the face of which, opposite the cylinder, presents an annular semi-circular groove 4. 5 denotes a circumferential ridge projecting from the inner lateral wall of the cylinder into the interior of the cylinder 1 near the mouth of the cylinder 1 to provide a constriction. The side of the ridge remote from the open end of cylinder diverges inwardly in relation to the length of the cylinder bore to its juncture with the cylinder wall. Consequently when the ram enters the cylinder, the cylinder ridge and the end portion of the ram cooperate to cause fluid dispelled from the open end of the cylinder to be formed into an annular stream or jet which passes rearwardly along the inner portion of the ram. 6 denotes the path of liquid ejected from the cylinder 1 as the plunger 2 enters the cylinder 1. It is tangential to the semi-circular groove 4.

In operation, when the plunger 2 enters the cylinder 1, the initial energy of the moving piston is wholly absorbed by the generation of pressure energy in the liquid contained in the cylinder and the pressure of the liquid therein rises to a high value. The liquid in the cylinder is displaced by the tapered portion 2' of the plunger and emerges from the cylinder 1 through the annular passageway between the tapered portion of the plunger 2 and the annular ridge 5 of the cylinder wall as an annular jet, and, since its pressure energy is converted to kinetic energy in its passage through the constriction, its velocity is high. The liquid ejected from the cylinder under high velocity enters the groove 4 tangentially of the inner wall of the groove 4, and substantially parallel to the axis of the plunger 2. By having the groove 4 of semi-circular shape, the fluid is deflected thereby in substantially the reverse direction. As the high velocity annular jet of water strikes the shouldered face of the plunger, a large proportion of the kinetic energy contained therein is given up to the plunger 2, thus exerting a retarding force against the plunger in addition to that encountered by the portion of the plunger 2' within the cylinder 1.

With the construction described above, the pressure of the fluid within the cylinder will remain substantially constant since less water will be ejected from the cylinder as the velocity of the plunger decreases. Consequently, the rate of velocity deceleration of the plunger during its retardation will remain constant. The semi-circular shape of the groove 4 assures maximum utilization of the force of the liquid striking the shouldered face of the plunger in retarding the movement of the plunger.

What is claimed is:

1. A dashpot comprising a cylinder adapted to be maintained full of fluid and having one end closed and the other end open, a ram having a portion which does not enter the cylinder and an end portion of less diameter than the diameter of the bore of the cylinder adapted to enter the cylinder, the portion of the ram which does not enter the cylinder having a part extending radially outwardly from the said end portion and providing a shoulder facing the open end of the cylinder, an annular ridge formed on the cylinder wall adjacent the open end and protruding radially into the cylinder bore, said ridge having the side thereof remote from the open end of the cylinder diverging inwardly in relation to the length of the cylinder bore to its juncture with the cylinder wall, whereby when the end portion of the ram is forced into the cylinder, the ridge and the end portion of the ram which enters the cylinder cooperate to cause fluid dispelled from the open end of the cylinder to be formed into an annular stream or jet which passes rearwardly along the entering portion of the ram, said shoulder having an annular groove located in the path of the annular fluid stream or jet dispelled from the open end of the cylinder as the ram enters the cylinder.

2. A dashpot as set forth in claim 1, in which the bottom of the annular groove is substantially semi-circular in transverse cross-section and the annular groove is so fashioned that the discharging path of the fluid dispelled from the open end of the cylinder, as the end portion of the ram enters the cylinder, is substantially tangential to the radial inner side of the groove.

3. A dashpot as set forth in claim 1, in which the surface of the end portion of the ram adjacent the shoulder merges smoothly into the annular groove.

References Cited in the file of this patent

UNITED STATES PATENTS

| | | |
|---|---|---|
| 992,804 | Richards | May 23, 1911 |
| 1,310,500 | Neubert | July 22, 1919 |
| 1,780,531 | Messier | Nov. 4, 1930 |
| 2,069,791 | Wallace | Feb. 9, 1937 |
| 2,168,679 | Myers | Aug. 8, 1939 |
| 2,365,727 | Pike | Dec. 26, 1944 |
| 2,553,810 | Carlson | May 22, 1951 |

FOREIGN PATENTS

| | | |
|---|---|---|
| 655,030 | Great Britain | July 4, 1951 |